May 31, 1927.
L. PAVIA
SHUTTLE
Filed Oct. 16, 1926
1,630,355
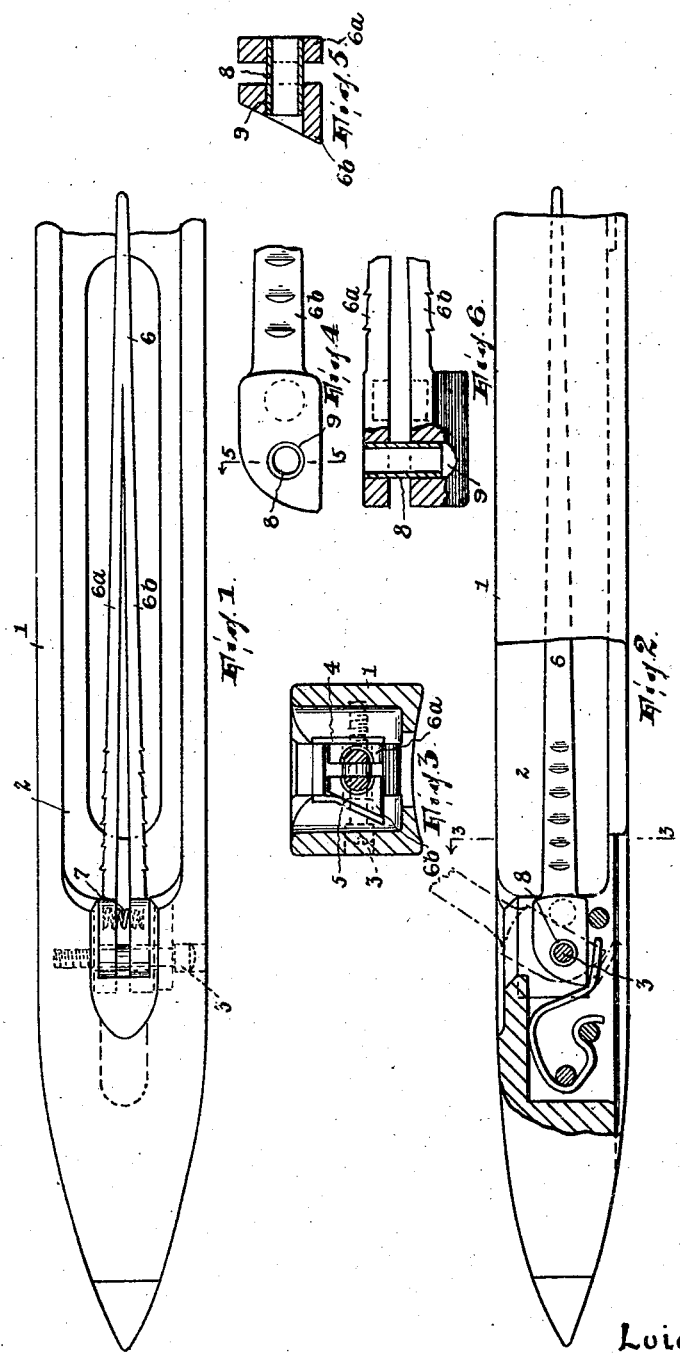
WITNESS
INVENTOR,
Luigi Pavia Patented May 31, 1927.

1,630,355

UNITED STATES PATENT OFFICE.

LUIGI PAVIA, OF ALLENTOWN, PENNSYLVANIA.

SHUTTLE.

Application filed October 16, 1926. Serial No. 141,940.

In my Patent No. 940,271 a shuttle is set forth in which there is a pivoted spindle split from its butt toward its point and adapted, by means including a spring and converging surfaces in the shuttle body, to be expanded as to its split part so as to grip the bore of a cop or other wound package when the spindle is depressed in the shuttle and to be collapsed to release the cop when the spindle is elevated. The present invention contemplates certain improvements in shuttles of this class and concerned principally with the pivoting joint of the spindle.

In the drawing,

Fig. 1 is a plan of a shuttle embodying the invention;

Fig. 2 is a side elevation thereof, partly in vertical section;

Fig. 3 is a section on line 3—3, Fig. 2;

Fig. 4 is a side elevation of the spindle butt;

Fig. 5 is a section on line 5—5, Fig. 4; and

Fig. 6 is a plan of the spindle butt, partly broken away.

1 is the shuttle body, 2 its longitudinal spindle cavity, open at the top side or surface of the shuttle body as is usually the case, and 3 is a pin traversing the reduced extension of this cavity at one end thereof, the pin affording in the present example the pivoting bearing for the spindle; the pin may as usual be screwed into or otherwise fixed in the shuttle body.

The side surfaces of the cavity extension converge toward said side (the top side) of the shuttle body, and one of these surfaces, 4, is perpendicular to the pin and the other, 5, inclined. These surfaces may as shown be afforded by metal wear plates.

6 is the spindle. It is split from its butt toward its point to form two legs $6^a$ and $6^b$. As will appear, it is shiftable around the pin as a bearing so as to stand depressed in or housed by the cavity or in elevated or projecting position. Between its legs is a spiral spring 7 and this spring and the converging surfaces 4, 5 of the cavity coact as means to cause the desired expansion or collapse of the split portion of the spindle when it is shifted one way or the other around the pin as a bearing, for which purpose the side surfaces of the legs when the spindle is depressed are best formed to converge upwardly, preferably by the side surface of the leg $6^a$ being perpendicular to the pin and the side surface of leg $6^b$ being pitched at the same inclination as the surface 5 of the cavity.

In the present construction only one leg, $6^a$, of the spindle has pivotal contact with the bearing (pin 3). In shuttles of this class and particularly where the split of the spindle is angularly related to the bearing this feature is new in itself. Such pivotal contact is, moreover, preferably given lateral extent exceeding the thickness of said leg, $6^a$, as by boring a hole in the said leg and fixing therein, as with a driven fit, a small tube 8, in the present example arranged to form a projection at the inner side of the leg.

The other leg (which it will appear has no pivotal contact with the bearing) has a hole 9 which receives with a sliding fit the tube or projection 8; in other words, the leg $6^b$ is in effect slidingly supported on the leg $6^a$ (the actual pivoting leg) through the medium of the part 8, which in effect is a dowel.

In the elevating and depressing of the spindle of my new construction herein set forth I avoid the screw-like action which characterized the movement of each spindle leg on the bearing of my old or patented construction, which in that case involved both a turning and a sliding lengthwise of the bearing; that is, the hereinbefore mentioned coacting means (4—5 and 7) to cause expansion or collapse of the split portion of the spindle when it is shifted one way or the other acts in this new construction to confine the part of the spindle actually having pivotal contact with the bearing to a given plane perpendicular to the bearing, since surface 4 is itself thus perpendicular. Therefore I reduce the wear of the pivoting joint between the spindle and shuttle body, in time resulting in the spindle being capable of undesirable lateral tilting. Again, in the present case the same extent of the bearing 3 transversely of the shuttle is availed of (by giving one leg, as $6^a$, a laterally elongated contact —8— with the bearing) to support the spindle against lateral tilting when it is more or less elevated as when it is depressed, which is another factor tending to reduce the wear of the pivoting joint.

Having thus fully described my invention what I claim and desire to secure by Letters Patent is:

1. In combination, with a shuttle body having a longitudinal cavity and a transverse bearing, a spindle arranged in the cavity and split in a plane intersecting the axis of the bearing from the butt toward the point of the spindle to form two legs, one such leg having pivotal contact, and the other being free of such contact, with the bearing, and said body and spindle having coacting means to collapse or expand the split part of the spindle when the same is pivotally shifted one way or the other.

2. In combination, with a shuttle body having a longitudinal cavity and a transverse bearing, a spindle arranged in the cavity and split in a plane intersecting the axis of the bearing from the butt toward the point of the spindle to form two legs, one such leg having pivotal contact with the bearing, and said body and spindle having coacting means, confining said leg to a given plane perpendicular to said bearing when the spindle is shifted around the same, to collapse or expand the split part of the spindle during such shifting one way or the other.

3. In combination, with a shuttle body having a longitudinal cavity and a transverse bearing, a spindle arranged in the cavity and split in a plane intersecting the axis of the bearing from the butt toward the point of the spindle to form two legs, one such leg having a laterally elongated pivotal contact with the bearing, and said body and spindle having coacting means to collapse or expand the split part of the spindle when the same is pivotally shifted one way or the other.

4. In combination, with a shuttle body having a longitudinal cavity and a bearing traversing the cavity, a spindle arranged in the cavity and split in a plane angularly related to the bearing from the butt toward the point of the spindle to form two legs, one such leg having pivotal contact with the bearing and one leg also having a laterally projecting dowel having a sliding fit in the other leg, and said body and spindle having coacting means to expand or contract the split part of the spindle when the same is pivotally shifted one way or the other.

5. In combination, with a shuttle body having a longitudinal cavity and a bearing traversing the cavity, a spindle arranged in the cavity and split in a plane angularly related to the bearing from the butt toward the point of the spindle to form two legs, each such leg being penetrated by the bearing and one having pivotal contact therewith and also having a laterally projecting tubular dowel concentric with said bearing and having a sliding fit in the other leg, and said body and spindle having coacting means to expand or contract the split part of the spindle when the same is pivotally shifted one way or the other.

In testimony whereof I affix my signature.

LUIGI PAVIA.